United States Patent [19]

Gray

[11] Patent Number: 5,758,335
[45] Date of Patent: May 26, 1998

[54] OPTIMIZING TABLE JOIN ORDERING USING GRAPH THEORY PRIOR TO QUERY OPTIMIZATION

[75] Inventor: James E. Gray, Phoenix, Ariz.

[73] Assignee: Bull HN Information Systems Inc., Billerica, Mass.

[21] Appl. No.: 722,825

[22] Filed: Sep. 27, 1996

[51] Int. Cl.⁶ .................................................. G06F 17/30
[52] U.S. Cl. ............................ 707/2; 707/4; 707/101
[58] Field of Search .............................. 707/2, 4, 101

[56] References Cited

U.S. PATENT DOCUMENTS

| | | | |
|---|---|---|---|
| 5,345,585 | 9/1994 | Iyer et al. | 395/600 |
| 5,423,035 | 6/1995 | DePrez | 395/600 |
| 5,469,568 | 11/1995 | Schiefer et al. | 707/2 |
| 5,666,525 | 9/1997 | Ross | 707/2 |

*Primary Examiner*—Thomas G. Black
*Assistant Examiner*—John C. Loomis
*Attorney, Agent, or Firm*—J. S. Solakian

[57] ABSTRACT

A method for improving the efficiency of queries in relational database management systems that use the exhaustive method of query optimization. The join structure of the query is examined prior to query optimization and tables are ordered according to graph theory. The tables in the FROM clause of the query are then reordered before query optimization. The access plan is thus developed from an already near-optimal table ordering. As a result, the number of table permutations examined during query optimization is pruned, the time to examining large numbers of table order permutations is avoided, and the optimization cost is reduced.

3 Claims, 1 Drawing Sheet

OPTIMIZING TABLE JOIN ORDERING USING GRAPH THEORY PRIOR TO QUERY OPTIMIZATION

BACKGROUND

This invention relates generally to relational database management systems. More specifically it relates to optimizing queries of the database using an improved method for pruning the number of possible table order permutations before an access plan is derived, thereby reducing the cost of optimization.

Large amounts of data are often stored in computer databases. The data may be arranged in different structures, such as hierarchical, network, or relational databases, each having different characteristics affecting data retrieval. Relational databases organize the data into relations, which can be thought of as tables where each row is a tuple and each column is an attribute. The software that accesses the data residing in the database on behalf of the user is called a relational database management system, RDBMS.

To save space in a database, it is desirable that data values not be duplicated unnecessarily. In a relational database, instead of one very large table holding duplicate data values, several smaller tables are created that contain unique data values. The smaller tables are related to each other through common attributes. Data for a given set of criteria may be retrieved by joining the smaller tables to represent the large table. Data is extracted by using a data processor to query the database for all rows in a table or tables that meet specific criteria.

A query language provides a set of computer commands for storing, retrieving and deleting the data. Query languages for relational database management systems do not require users to specify the manner in which data is accessed. Rather, the user specifies what data extraction is desired, and the database management system determines how the access to the database is to take place. A query algorithm has to choose among a variety of access paths to respond to a query. The algorithms that optimize the access plan are called query optimizers.

A join operation is a common operation for combining or relating the data from two or more tables. For n number of tables, there are n! number of possible orderings of the table accesses to consider. Generally table permutations are examined in arbitrary, or user-input order, until the desired data is found. The table containing the data is accessed from storage with an input/output (I/O) operation. The method of accessing these tables is optimized before query execution, looking for the quickest access possible. The more tables referenced, the more time is spent in the optimization phase generating permutations. Large numbers of tables, for example more than eight, can result in excessive time spent in finding the optimal access plan. It has been shown that some queries spent 99% of their time in the optimizer phase because of excessive optimization time, and have relatively short execution time once the access method is determined. Improving the efficiency of the optimization will improve the efficiency of the query. Therefore, it is desirable to limit the number of table permutations so as to reduce cost of optimization while still allowing the quickest access plan to be found.

Query optimization takes into account several factors in determining the quickest access plan. These factors include the number of rows in each table, the distribution of data values in a given column, the availability of indexes on referenced columns and the order in which to join the tables in the query. A major factor is the cost in terms of accessing the data in storage. It is desirable to retrieve the data efficiently, as measured in terms of the time it takes to access the data using the I/O operation.

It is desirable, then, to determine the optimal access plan across all possible table permutations such that desired data may be retrieved from the database at the least cost, with the fewest I/O operations. Several procedures are known in the art for selecting optimal join orders, each with its own advantages and disadvantages. The Dynamic Programming Algorithm (DPA), commonly used on IBM mainframe computers, uses the iterative construction of a "deep left" search tree to join tables. This algorithm tends to be accurate in producing optimal join orders, but it uses excessive time and memory space. The Greedy Algorithm, a commonly used RDBMS for personal computers, is a polynomial time algorithm. Greedy algorithms look for the cheapest next cost step and are thus only locally optimal. While this algorithm is quicker and uses less space that the DPA, the globally optimal access plan can be missed entirely. A third known query optimization method is the KBZ Algorithm. It, too, is a polynomial time algorithm and suffers the disadvantage that the resultant access plans are not as fast as those produced by DPA.

Another known query optimization method known in the art is the exhaustive approach, in which all potential join orders are evaluated. The exhaustive approach is a brute force technique that searches the entire space of access plans. It is thorough but inefficient because it is likely that many table order permutations will have to be examined before the fastest access plan is found. This algorithm can be improved by reducing the number of table order permutations that need to examined in order to find the optimal access plan. Reducing the number of table order permutations is called permutation "pruning." Pruning eliminates the examination of a particular table ordering when the cost of the ordering exceeds that of the best access method seen so far. This practice avoids computations, thereby reducing the optimization time, sometimes drastically. With permutation pruning, a good access plan may be found quickly and the process time can be reduced significantly because worse access plans are discarded sooner.

The object of this invention is to provide a method for finding a good access plan quickly. Another object is to decrease the cost of optimization by reducing the number of computations necessary before finding the optimal access plan. Another object of this invention is to reduce the time necessary to find the optimal access method by choosing a table ordering which has a cost that is close to that of the final optimal table ordering. In particular, an object of this invention is to pre-order the tables in the FROM clause of the query before query optimization, such that the access plan is thus developed from an already near-optimal table ordering. A further object of this invention is to order the tables listed in the FROM clause according to optimal join order in the WHERE clause as determined by graph theory.

SUMMARY OF THE INVENTION

The present invention is a method for improving the efficiency of queries in relational database management systems that use the exhaustive method of query optimization. The join structure of the query is examined prior to query optimization and tables are ordered according to graph theory. The tables in the FROM clause of the query are then reordered before query optimization. The access plan is thus developed from an already near-optimal table ordering. As a result, the number of table permutations examined during query optimization is pruned, the time to examine large numbers of table order permutations is avoided, and the optimization cost is reduced.

DETAILED DESCRIPTION OF THE PREFERRED EMBODIMENT

Figure 1:
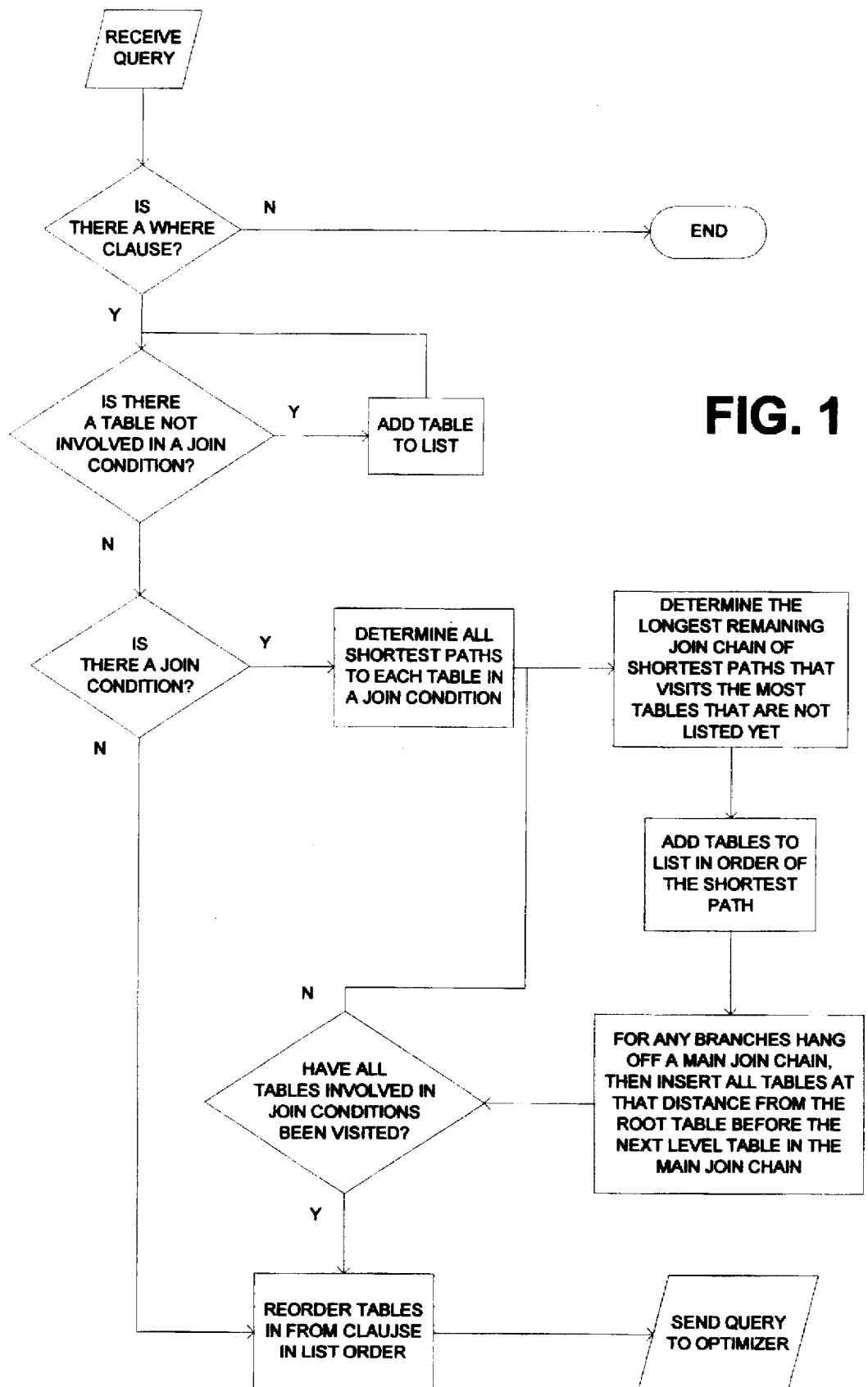
FIG. 1 is a flow diagram of the present invention.

A user submits a query to a data processor to retrieve rows of data from the database, which has been previously divided into tables. A common language used to access the data is called SQL, for Structured Query Language. The optimization phase then translates the query into the actual access plan. The access plan is the list of actions necessary to evaluate a given query. The execution phase implements the access plan to retrieve the desired data.

A standard query takes the format:

SELECT (attribute a, attribute b . . . attribute z)

FROM (table 1, table 2 . . . table n)

WHERE (table 1. attribute a=table 2. attribute a, and table 2. attribute b=table 3. attribute b).

In shorthand notation this can be abbreviated as:

SELECT Ca, Cb . . . Cz

FROM T1, T2 . . . Tn

WHERE T1.Ca=T2.Ca AND T2.Cb=T3.Cb.

The SELECT clause indicates which columns are to be retrieved by the query. The FROM clause indicates which tables are to be referenced by the query, and the WHERE clause indicates which rows are to be retrieved from the tables. Where the database has been divided into two or more tables, a join operation is required to establish information from the relationships between tables. Relating columns of two different tables in order to produce combined information is called a join operation, which in the format above comprises the WHERE clause.

Given n tables in the FROM clause, there are n! permutations of the possible access orders of the tables. For example, there are six permutations of three tables A, B, and C namely: A-B-C, A-C-B, B-A-C, B-C-A, C-A-B, C-B-A. Some tables may accessed more easily than others due to several factors such as whether there is an index present, the size of the table, the relative order of the rows, etc. The consequence of these variable factors is that the tables, as listed in the FROM clause, may not be in the most efficient order for searching to retrieve data. An optimal order is desired.

The present invention is a method for ordering the tables before optimization such that the optimal access plan to these tables may be found quickly. The access plan may require certain actions to be performed on the tables, such as sorting, performing join operations, accessing a table by its index, sequentially scanning a table, performing projection of needed tables, eliminating certain rows by restrictions, accessing tables in a given order, etc. Each action has a specific time overhead to access data from storage. Accessing data in a storage location, such as a tape or disk drive, takes I/O operations. The method of the present invention improves the cost of optimizing the query by finding the best access plan more quickly. The best access plan is the plan with the least number of I/O operations. The fewer I/O operations, the lower the cost. An estimated cost of accessing a given table ordering is known a the permutation cost.

In essence, this invention evaluates one factor of query optimization before the query optimizer goes to work, namely the initial table ordering. The present invention determines the near optimal join order of the tables before the query optimizer operates and then reorders the tables in the FROM clause accordingly. The query optimizer may reorder the tables again to take into account other factors not taken into account by this invention, but essentially the tables will be in near-optimal order before they reach the query optimization (access plan development) phase.

During the development of the access plan using an exhaustive algorithm, the query optimizer will generate all permutations of the tables queried. Each permutation will be evaluated as to access cost. The evaluation of partial orderings will be aborted once the cost or the partial ordering has exceeded the best access plan. This avoids evaluating some of the n! orderings and improves performance. However, without prior knowledge of the most efficient table ordering, it is likely that some number of permutations will be evaluated before finding the least-cost access. These evaluations can be eliminated by pre-ordering the tables essentially such that the near least-cost permutations are evaluated first. Pruning eliminates some of these unnecessary permutations based on a join graph such that the least costly permutation is found quickly during the optimization phase. In the example above, pruning might eliminate the need to examine the orderings starting with table C. By ordering the tables according to the join graph, fruitless examination of more "expensive" permutations is avoided, and the optimization time can be cut dramatically.

The present invention helps to optimize queries by ordering tables in an initial order that is likely to be the final table ordering found early in the optimization phase. The method examines a given WHERE clause and finds all join conditions that are present. Chains of the join conditions that relate groups of tables are then formed and are used to order the tables in the FROM clause prior to optimization. The tables are ordered according to the join graph created using graph theory, which is known in the art and described in greater detail below.

The basic principles of the theory provide that join chains are created by first ordering the tables in the order they appear in the join conditions. For example, in the following WHERE clause, WHERE T1.Ca=T3.Ca AND T2.Cb=T4.Cb the tables would be ordered in the join chain as T1, T3, T2, T4.

Each time a new table appears in the WHERE clause it is added to the bottom (end) of the list. If a table is repeated, it is not added again to the list, but the table connected to the repeated table in the join condition is added to the list. The repeated table is considered the root of the connected table, which is considered a branch of the root table. For example, in the following WHERE clause:

WHERE T3.Ca=T5.Ca AND T5.Cb=T1.Cb AND T1.Cc= T4.Cc AND T4.Cd=T2.Cd the tables would be ordered in the join chain as T3, T5, T1, T4, T2. The following WHERE clause is an example of root and branch conditions, WHERE T1.Ca=T2.Ca AND T1.Cb=T3.Cb AND T1.Cc= T4.Cc AND T3.Cd=T5.Cd AND T5.Ce=T6.Ce which produces the following join chain T1, T2, T3, T4, T5, T6. The root of the chain is T1, and T2, T3, and T4 are branches of that root. The method is then repeated for any sets of tables that have tables joined to each other, but not to those just processed.

The following is a simple example of the present invention. Assume a given database has at least five columns (C1–C5) and is divided into at least five tables (T1–T5). A user wants to retrieve certain data having certain attributes from five tables within the database. The following query is entered into the data processor:

SELECT Ca, Cb
FROM T1, T2, T3, T4, T5
WHERE T3.Ca=T5.Ca AND T5.Cb=T1.Cb AND T1.Cc= T4.Cc AND T4.Cd=T2.Cd.

Normally, the optimizer would examine all permutations of the five tables, comparing the cost of accessing the tables one permutation against the cost of the next permutation. Each time a cheaper path is found, it replaces the more expensive one. All permutations are examined.

The present invention is invoked before optimization. Using the query above, a join chain is formed from the tables in the WHERE clause:

T3-T5-T1-T4-T2

Graph theory is used to determine this join chain using the shortest path of access between tables, which correlates eventually to fewer I/O operations. Any tables not involved in a join chain are placed first in the list of tables, since they will be participating in a cross product. If there are multiple chains, the longest chains are chosen first for use in table ordering. If any branches hang off a main join chain, then all tables at that distance from the root table of the chain occur together before the next level in the main join chain. Ideally, the shortest path of joins between each table is determined. Of these shortest-path chains, the chain containing all the tables is chosen as the near-optimal path. If no single chain contains all tables, multiple chains are used. The method is then repeated for any sets of tables that have tables joined to each other, but not to those just processed. In this case, no such additional sets are present.

The tables are then rearranged in the FROM clause in the order of the tables found in the join chain. The new FROM clause is:

FROM T3, T5, T1, T4, T2.

The FROM clause is then inserted into the query, the access is plan is derived by the query optimizer, and the access plan is then executed. Because the tables are put in order to find the data early in the search, less time searching of unsuccessful branches is spent determining the optimal access plan during the optimization phase.

The following example explains the present invention in more detail. The sample WHERE clause from the query is:

WHERE T1.Ca=T2.Ca AND T1.Cb=T3.Cb AND T1.Cc= T4.Cc AND T3.Cd=T5.Cd AND T5.Ce=T6.Ce AND T7.Cf=T8.Cf AND T8.Cg=T9.Cg

First, the join conditions are determined. A graph data structure and corresponding algorithms are then used to determine the shortest, or least-cost, paths for accessing the various tables. A graph is drawn wherein the tables are considered vertices and the joins are considered edges. For specialized applications such as high performance data warehousing, the optimizer may add conditions known to be true under the transitive property of join conditions to enable a longer chain graph to be found. For a reference on this subject, see Deo, N. *Graph Theory with Applications to Engineering and Computer Science*, Prentice-Hall 1974, pp. 290-301, incorporated herein by reference.

The resultant join graph for the above WHERE clause looks like:

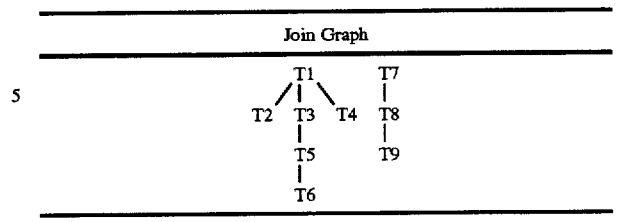

where the tables T1, T2, T3, T4, T5, T6, T7, T8 and T9 are the vertices of the graph and the following joins constitute the edge list:

Edge List

E1=T1-T2
E2=T1-T3
E3=T1-T4
E4=T3-T5
E5=T5-T6
E6=T7-T8
E7=T8-T9

An adjacency matrix is then created to determine which tables are connected to each other. Connected tables lie along the same path. The matrix is created from the graph, where $A(I,J)=1$, if vertex I is adjacent to vertex J, and $A(I,J)=0$ if the vertices are not adjacent. The resultant adjacency matrix for this example is:

| Adjacency Matrix | | | | | | | | | |
|---|---|---|---|---|---|---|---|---|---|
| | T1 | T2 | T3 | T4 | T5 | T6 | T7 | T8 | T9 |
| T1 | 0 | 1 | 1 | 1 | 0 | 0 | 0 | 0 | 0 |
| T2 | 1 | 0 | 0 | 0 | 0 | 0 | 0 | 0 | 0 |
| T3 | 1 | 0 | 0 | 0 | 1 | 0 | 0 | 0 | 0 |
| T4 | 1 | 0 | 0 | 0 | 0 | 0 | 0 | 0 | 0 |
| T5 | 0 | 0 | 1 | 0 | 0 | 1 | 0 | 0 | 0 |
| T6 | 0 | 0 | 0 | 0 | 1 | 0 | 0 | 0 | 0 |
| T7 | 0 | 0 | 0 | 0 | 0 | 0 | 0 | 1 | 0 |
| T8 | 0 | 0 | 0 | 0 | 0 | 0 | 1 | 0 | 1 |
| T9 | 0 | 0 | 0 | 0 | 0 | 0 | 0 | 1 | 0 |

Now that an adjacency matrix of the join graph has been built, the shortest path (join chain) between each pair of tables is determined by building a path length matrix. A path length is the number edges traversed on the join graph from a first table to a second table, that is where $D(I,J)=$path distance from vertex I to vertex J. Tables that are not joined to another have an infinite path length. The path length matrix is:

| Path Length Matrix | | | | | | | | | |
|---|---|---|---|---|---|---|---|---|---|
| | T1 | T2 | T3 | T4 | T5 | T6 | T7 | T8 | T9 |
| T1 | 0 | 1 | 1 | 1 | 2 | 3 | ∞ | ∞ | ∞ |
| T2 | 1 | 0 | 2 | 2 | 3 | 4 | ∞ | ∞ | ∞ |
| T3 | 1 | 2 | 0 | 2 | 1 | 2 | ∞ | ∞ | ∞ |
| T4 | 1 | 2 | 2 | 0 | 3 | 4 | ∞ | ∞ | ∞ |
| T5 | 2 | 3 | 1 | 3 | 0 | 1 | ∞ | ∞ | ∞ |
| T6 | 3 | 4 | 2 | 4 | 1 | 0 | ∞ | ∞ | ∞ |
| T7 | ∞ | ∞ | ∞ | ∞ | ∞ | ∞ | 0 | 1 | 2 |
| T8 | ∞ | ∞ | ∞ | ∞ | ∞ | ∞ | 1 | 0 | 1 |
| T9 | ∞ | ∞ | ∞ | ∞ | ∞ | ∞ | 2 | 1 | 0 |

Now the path between each pair of vertices is determined, the path moving from one connected table to another, until the desired pair of tables is connected. The path is determined by traversing tables that are connected as shown in the adjacency matrix. The resultant table of shortest paths is called the optimal policy table, and it shows which tables are visited along the shortest path to a given table.

In this example, the shortest path is determined using ALGORITHM 97 by W. R. FLOYD, COMM.ACM Vol. 5 1962, 345, incorporated herein by reference. This algorithm starts with a matrix of direct distances, and sequentially computes matrix Dn from Dn−1 where Dk(i,j) gives the length of the shortest path from i to j using from 1 to k as intermediate vertices. Tables that are not joined have infinite path lengths, and are not shown here.

The chains of shortest paths for the desired pairs are:

Optimal Policy Table

| Pair | Path length | Path |
| --- | --- | --- |
| T4 to T6 | 4 | T4, T1, T3, T5, T6 |
| T6 to T4 | 4 | T6, T5, T3, T1, T4 |
| T5 to T4 | 3 | T5, T3, T1, T4 |
| T4 to T5 | 3 | T4, T1, T3, T5, |
| T2 to T3 | 2 | T2, T1, T3 |
| T3 to T2 | 2 | T3, T1, T2 |
| T2 to T4 | 2 | T2, T1, T4 |
| T4 to T2 | 2 | T4, T1, T2 |
| T3 to T4 | 2 | T3, T1, T4 |
| T4 to T3 | 2 | T4, T1, T3 |
| T3 to T6 | 2 | T3, T5, T6 |
| T6 to T3 | 2 | T6, T5, T3 |
| T5 to T1 | 2 | T5, T3, T1 |
| T1 to T5 | 2 | T1, T3, T5 |
| T7 to T9 | 2 | T7, T8, T9 |
| T9 to T7 | 2 | T9, T8, T7 |

The path length matrix is examined to find the chain having the most number of tables. Because this chain is made from the shortest path between each table, the chain will be the shortest path to the most number of tables. Once the optimizer evaluates that path, subsequent evaluations of partial orderings contained within the chain will be pruned, eliminating the time spent to evaluate many permutations.

The chain having the most number of tables is for pair T4 to T6 (or T6 to T4), the path being T4, T1, T3, T5, T6. The only table yet unvisited, T2, is a branch from T1 at the same level as T3 and T4. If any branches hang off a main join chain, then all tables at that distance from the root table of the chain occur together before the next level in the main join chain. Therefore, T2 is added before T5. The new table order is T4, T1, T3, T5, T6, T2. If all joined tables are not visited on this chain, the chain having the next highest number of tables is selected, and the tables ordered accordingly. This chain selection and ordering continues until all joined tables have been visited.

T7, T8, and T9 are joined together, but not joined to the previously visited tables; a join chain must be created for these tables using the same process. From the path length matrix it can be seen that the shortest path containing all tables is T7, T8, T9, having a path length of 2. This chain is then added to the new table order such that the new table order is T4, T1, T3, T5, T6, T2, T7, T8, T9. The tables in the FROM clause are then ordered in the order of the chains selected.

While the invention has been particularly shown and described with reference to the preferred embodiment thereof, it will be understood by those skilled in the art that various changes in form and details may be made therein without departing from the spirit and scope of the invention.

I claim:

1. In a relational database computer system including a data processor, a stored database and a plurality of database tables wherein one or more of the tables are retrieved by the processor by means of query commands performing a plurality of join operations on the tables using a WHERE clause and a FROM clause, a method for improving the query optimization comprising the steps of:
   a) examining the WHERE clause and finding all join conditions that are present;
   b) forming a chain of the join conditions;
   c) establishing a list of tables wherein:
      I) tables that are in the WHERE clause but not in the join conditions are listed first;
      ii) tables in the join chains formed according to graph theory are listed next in the same order as they appear in the join chain such that the tables from the longest chains are listed before the tables from shorter chains and all tables at a given distance from a root table of the chain occur together before the next level in the join chain;
   d) reordering the tables in the FROM clause in the list order.

2. A computer-implemented method for performing relational database queries on a database comprising a plurality of tables, the method comprising the steps of:
   a) receiving a user query for extracting certain data values from a plurality of tables in a database, the query comprising at least a FROM clause and a WHERE clause;
   b) examining the WHERE clause condition in the user query and finding all join conditions that are present;
   c) forming a chain of the join conditions according to graph theory;
   d) establishing a list of tables wherein:
      i) tables that are in the WHERE clause but not in the join chain are listed first;
      ii) tables in the join chains are listed next in the same order as they appear in the join chain, and the tables from the longest chains are listed before the tables from shorter chains; and
   e) reordering the tables in the FROM clause in the list order; and
   f) executing the query.

3. In a relational database management system comprising a data processor, memory storing a database, and a plurality of tables within the database from which data is retrieved by a user submitting a query comprising a FROM clause and a WHERE clause, wherein an optimal access plan to the data is determined by an algorithm which evaluates substantially all table order permutations, a method for improving the efficiency of query of the database comprising the steps of:
   a) examining the join structure of the WHERE clause prior to determining the access plan, further comprising the steps of:
      i) determining tables involved in join operations in the WHERE clause;
      ii) determining a shortest path to each table involved in a join operation according to graph theory;
      iii) selecting a join chain of the shortest paths that goes to the most number of tables involved in join operations; and iv) if the join chain does not involve all tables, selecting another join chain of the shortest paths that goes to the most number of remaining tables involved in join operations;

v) adding join chains of the shortest paths until all tables involved in join operations are represented;

b) ordering the tables in the FROM clause further comprising the steps of:

I) listing tables not involved in a join operation first, ii) adding to the list the tables in the order of the join chains of the shortest paths determined in step a above;

c) reordering the tables in the FROM clause in list order;

d) using the query optimizer to develop the access plan with the newly reordered FROM clause.

* * * * *